US005544567A

United States Patent [19]
Davis et al.

[11] Patent Number: 5,544,567
[45] Date of Patent: Aug. 13, 1996

[54] EARLY PRODUCT REMOVAL ALARM

[75] Inventors: John Davis, Shreveport; John Kinch, Bossier City, both of La.

[73] Assignee: The Frymaster Corporation, Shreveport, La.

[21] Appl. No.: 357,112

[22] Filed: Dec. 16, 1994

[51] Int. Cl.⁶ .................................................. A47J 37/12
[52] U.S. Cl. .............................. 99/336; 99/337; 99/342; 99/344; 99/403; 99/493
[58] Field of Search ............................ 99/336, 337, 342, 99/344, 403, 493, 335

[56] References Cited

U.S. PATENT DOCUMENTS

| | | | |
|---|---|---|---|
| 3,071,064 | 1/1963 | Horvath | 99/336 |
| 3,242,849 | 3/1966 | Wells | 99/336 |
| 3,430,553 | 3/1969 | Di Pietro | 99/336 |
| 3,525,299 | 8/1970 | Gouwens et al. | 99/336 |
| 4,217,482 | 8/1980 | Wadia | 99/337 |
| 4,951,558 | 8/1990 | Figliuzzi | 99/336 |
| 5,341,728 | 8/1994 | Ejiri et al. | 99/344 |
| 5,398,597 | 3/1995 | Jones et al. | 99/344 |

*Primary Examiner*—David Scherbel
*Assistant Examiner*—James F. Hook
*Attorney, Agent, or Firm*—Harris, Tucker & Hardin, P.C.

[57] ABSTRACT

The present invention relates to a system to warn of early removal of food from a cooking medium. The system is a combination of a frypot, a basket sensor and an alarm where the frypot is a container holding a cooking medium such as oil or shortening. Food items to be cooked are placed in a control zone in the cooking medium and held by a basket that holds the food submersed in the cooking medium. The basket sensor is installed to detect the presence of a basket in the container. The basket sensor is monitored by a cooking computer that controls the alarm, activating the alarm if there is no basket in the frypot when a cook cycle is initiated or when the basket is removed before the cook cycle is completed. The cooking computer monitors the cooking cycle by using a preprogrammed cook time and adjusting the time based on variations measured in the cooking medium temperature or other factors.

25 Claims, 6 Drawing Sheets

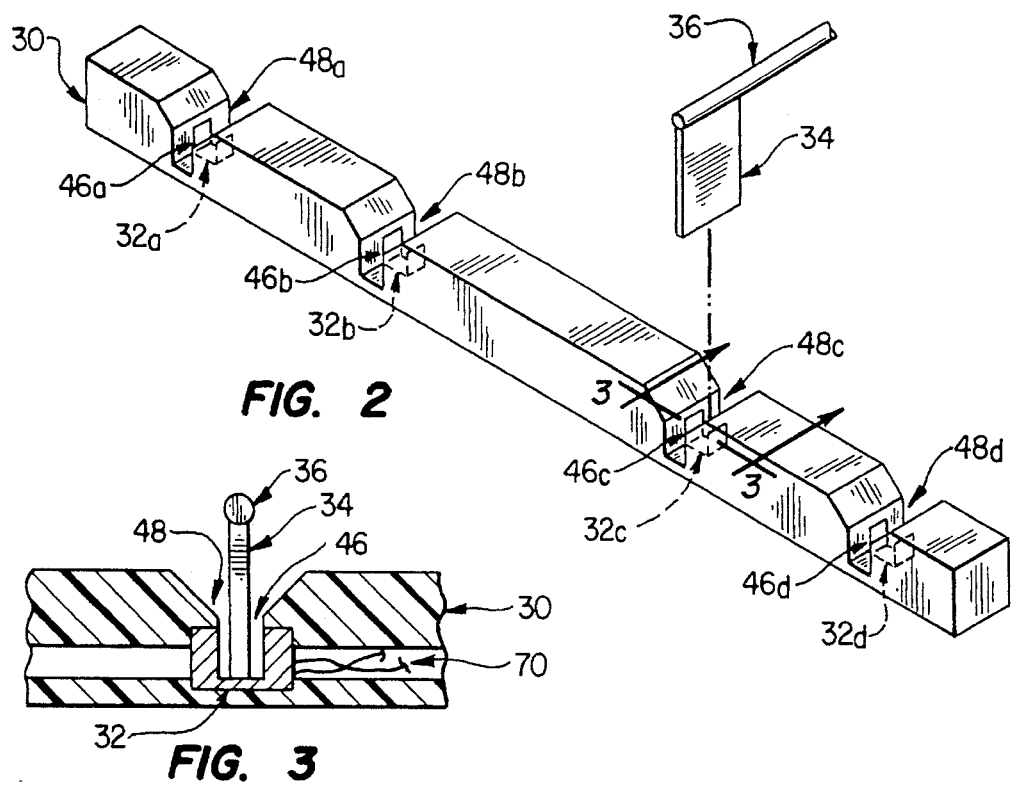
FIG. 2
FIG. 3
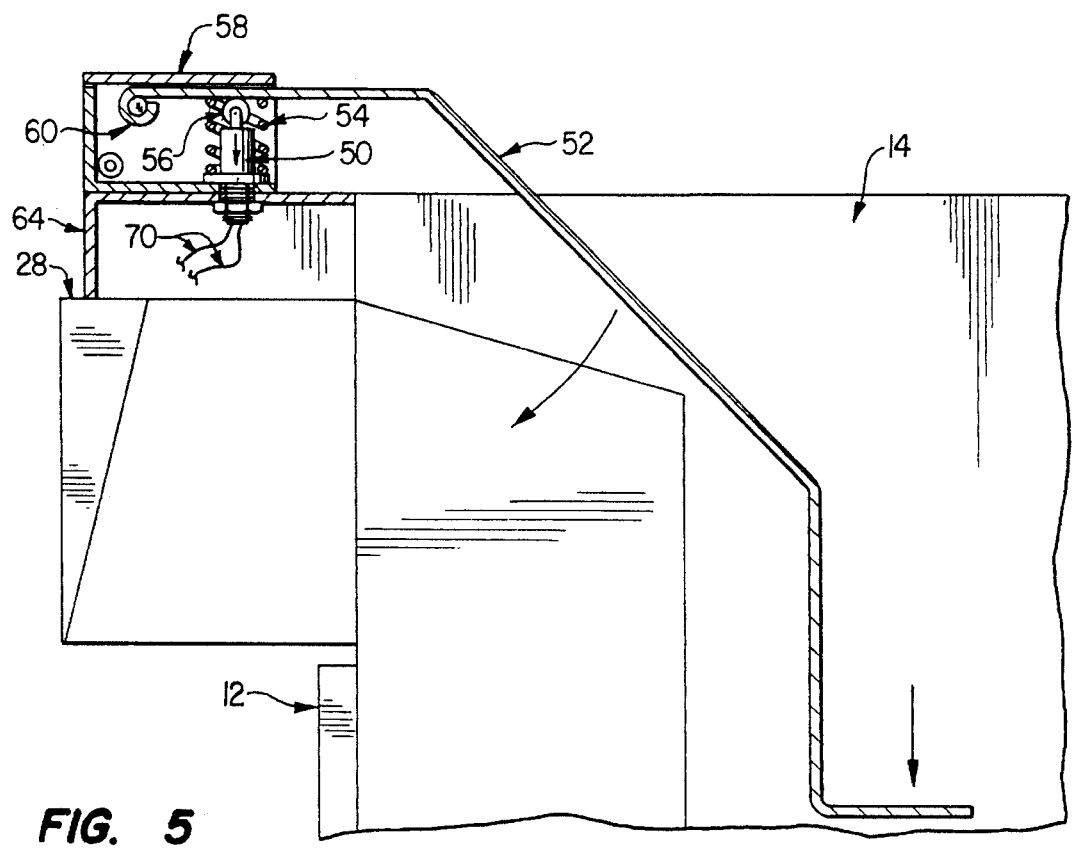
FIG. 5

EARLY PRODUCT REMOVAL ALARM

TECHNICAL FIELD OF THE INVENTION

The invention relates to a system to warn of early removal of food from a cooking medium.

BACKGROUND OF THE INVENTION

Undercooked foods can be a serious health problem. Raw meats can harbor dangerous bacteria like *e coli, staphylococcus* and *salmonella*. The best method of preventing the spread of these bacteria is to make sure that all foods, particularly chicken and other meats, are thoroughly cooked.

In a commercial restaurant setting it is sometimes difficult to ensure proper cooking. Variations in size and initial temperatures of food products as well as the desire for fast service can cause undercooked food to be served to customers.

Sophisticated cooking computers have attempted to address the problem of variations in size and initial temperature. No one, however, has addressed the problem of a cook in a hurry removing the food from the cooking medium before the proper cook time has expired.

A need exists for a system designed to prevent the early removal of food from the cooking medium.

SUMMARY OF THE INVENTION

The present invention relates to a system to warn of early removal of food from a cooking medium. The system includes a container holding a cooking medium such as oil, shortening or water. Food items to be cooked are held by a basket and placed into container submersing the food in the cooking medium. A basket sensor is installed to detect the presence of a basket in the container. The basket sensor can be monitored by any suitable system such as a cooking computer like the ones disclosed in U.S. Pat. Nos. 4,437,159, 4,672,540 and 4,663,710. This type of cooking computer monitors the cooking cycle by using a preprogrammed cook time and adjusts the cook time based on variations measured in the cooking medium temperature by a temperature probe.

During the cooking cycle a cooking computer monitors the basket sensors to ensure that a basket is in the container to begin the cook cycle and that the basket remains in the container until the cook cycle is complete. If the basket is not in the container to begin the cook cycle or if the basket is removed from the container before the cooking time is complete, a signal is sent from the cooking computer to an alarm controller. The controller activates an alarm that can only be deactivated by turning of a key switch. The particular basket that was removed early is indicated by a decimal point or other visual indication in the cooking computer's alpha-numeric display.

More specifically, the present invention is a combination of a timed frying apparatus, a basket sensor and an alarm for detecting when a cooking cycle can be initiated and for signalling when food being cooked in the frying apparatus has been removed for serving before a cooking time representing the end of the cook cycle has elapsed. The timed frying apparatus is a heated frypot associated with a control system that responds to input from a user initiating a cook cycle for a particular food product, such as chicken, and that generates a signal when the cook cycle is completed, such as a message in the control system display that the cook cycle is complete. The control system may be referred to as a controller.

The controller also monitors one or more basket sensors mounted on the frypot. Each basket sensor is designed to provide a signal to the controller when a batch of food is placed in the frypot. The signal from the basket sensor indicates to the controller that the controller can initiate a cook cycle and can maintain the cook cycle. If the signal is not present when the user begins the cook cycle or if the signal is interrupted before the cook cycle is completed, the controller initiates an alarm which sends an audible and/or visual warning to the user indicating that the food in question may not be properly cooked.

The frypot can be configured to hold and cook multiple, physically separated batches of food in corresponding control zones or cooking zones in the frypot at any given time. Each batch of food to be cooked is held in a wire basket as is conventional. In such a configuration a basket sensor is required for each batch of food corresponding to a zone in the frypot. The controller in such a frypot configuration will maintain separate cook cycles for each zone and basket sensor combination. The alarm is energized if a cook cycle for a cook zone was initiated without the basket sensor sending the proper signal to the controller indicating that a basket is present in the cook zone, or if the signal is interrupted before the cook cycle is completed.

The controller also controls a display panel or alpha numeric display that indicates the state of the controller or cook cycle to the user. When the alarm is activated by the controller, the controller activates a symbol indicating which control zone in which a basket of food is cooking corresponds to the interrupted signal from the basket sensor.

The basket sensors for the cook zones are generally switches connected between an input to the controller and ground. The switches can be any type of two position switches like magnetic interrupter switches, paddle switches or optical switches. When preferred magnetic switches are used a metallic tab or shield plate is connected to the basket used to hold the physically separated batches of food such that the shield plate closes the magnetic switches when the basket is in the particular control zone. The magnetic switches themselves are mounted on a mounting bar which is attached to a horizontal surface adjacent to the frypot.

If paddle switches are used the paddle switches are mounted adjacent to the frypot and protected by a housing. A lever arm extends from each paddle switch into the frypot in such a manner that the weight of a basket in the control zone forces the arm down and operates the switch.

BRIEF DESCRIPTION OF THE DRAWINGS

Other objects and features of the invention will become more readily apparent from the following detailed description when read in conjunction with the accompanying drawings, wherein:

FIG. 2 is a perspective view of the magnetic switch mounting strip and the shield plate attached to a basket which serves to operate the switch;

FIG. 3 is a sectional view along lines 3—3 in FIG. 2;

FIG. 5 is a sectional view along lines 5—5 in FIG. 4;

DETAILED DESCRIPTION

Figure 1:
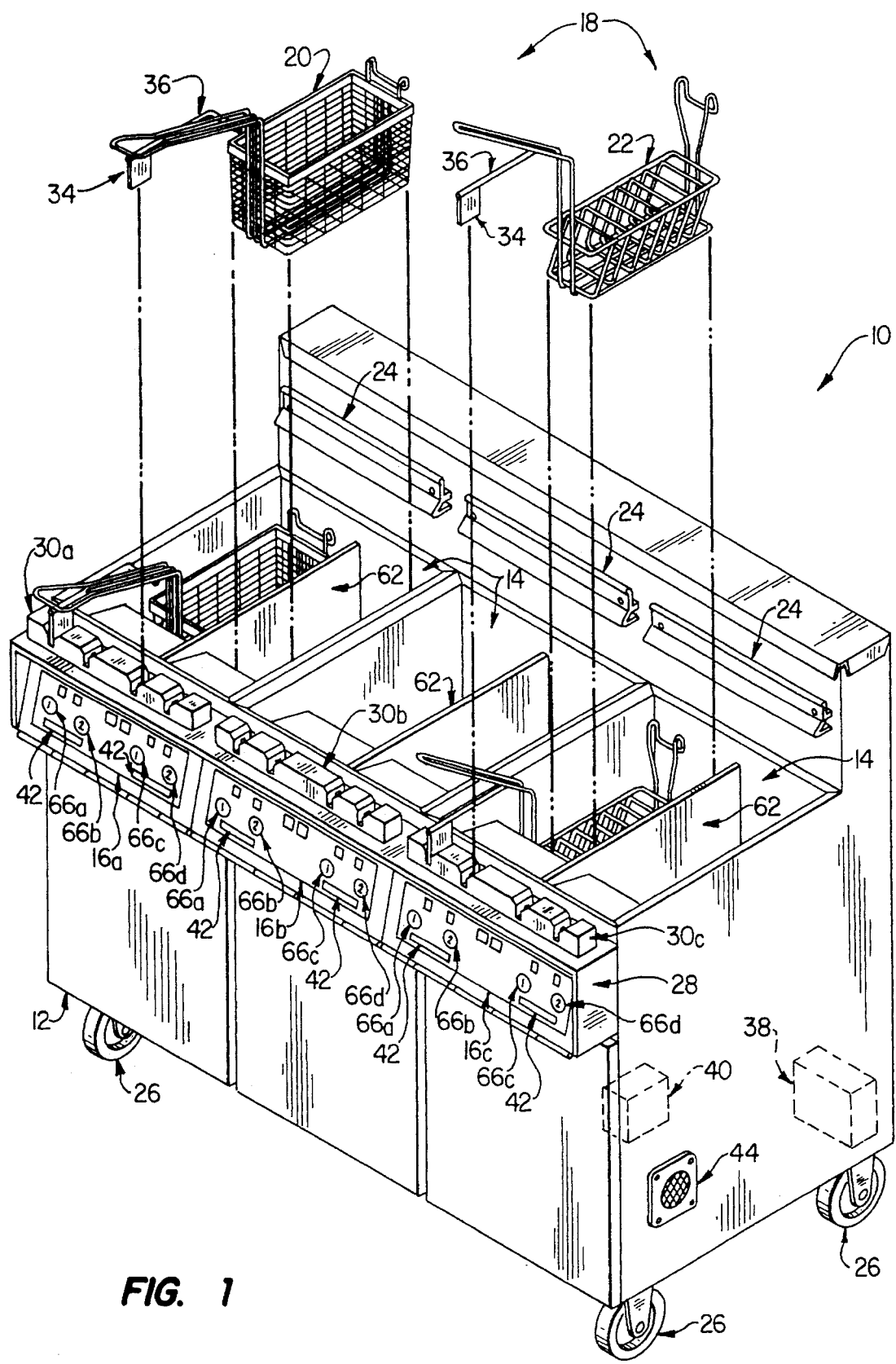
FIG. 1 is perspective view of a commercial fryer assembly which incorporates a first embodiment of the invention.

Referring now to FIGS. 1, 2 and 3, a description of the preferred embodiment of the present invention is given.

A commercial fryer assembly generally indicated by reference numeral 10 includes a cabinet 12 mounted on wheels 26 and having at least one container or frypot 14. The assembly 10 is modular and may include a plurality of frypots in one assembly. The individual frypots 14 may be physically divided in half zones by dividers 62 and filled with a cooking medium, usually oil or shortening, for cooking food. The individual frypots 14 are each monitored by a control system which may comprise a conventional cooking computer 16a–c, and are designed to hold from two to four baskets generally indicated by reference numeral 18 in four individual cooking zones, depending on whether full-size baskets 20 or half-size baskets 22 are used. The baskets 18, used to hold a batch of food product while cooking, can be held by basket rack 24 mounted on cabinet 12 when not being used for cooking in frypot 14.

The individual frypots 14 shown in FIG. 1 are divided into half zones by insulated dividers 62 running from front to back in housing 12. Each half zone has its own heating system, either electric or gas fired, and suitable temperature sensing devices or probes tied into a control system comprising a cooking computer 16a for frypot 14 on the left, 16b for frypot 14 in the middle and 16c for frypot 14 on the right. Each half zone of the frypots 14 in FIG. 1 can be controlled at a temperature different than its other half and each half zone comprises two individual cooking zones. Two basket sensors are associated with each cook zone and configured so that one of the basket sensors will respond to the positioning of a full sized basket for cooking in the frypot and either of the basket sensors will respond to the positioning of half sized baskets in the frypot. In other words, there are four cooking zones in each frypot 14 which are separately controlled as to cook time and the presence of a basket. However, this is exemplary of the environment of the invention for it is not necessary that frypots 14 have any dividers and in that case a singular heater and temperature probe could be provided for each frypot 14. In such case there would still be four basket sensors and four cooking zones, one for each basket sensor, even though the four cooking zones are controlled at the same temperature in an undivided frypot 14.

The cooking computers 16a–c monitor the temperature of frypots 14 and adjust the cooking time in each cooking cycle for different foods. The cooking time is increased if the cooking oil is below a desired temperature and decreased if the cooking oil is above the desired temperature for cooking, so that the desired amount of cooking is obtained for a given product. This type of cooking control is conventional. The computer has a programmed "loop" that regularly samples the frypot or frypot half zone temperature and adjusts a selected predetermined cook time by means of an algorithm or look up table according to variances of the actual temperature from a nominal desired cooking temperature. The program is modified to regularly sample the basket sensors as well as latch an alarm as explained herein.

Buttons 66a–d begin the cooking cycles for each of the four cook zones in the individual frypots 14. The display panel consisting of an alpha-numeric display 42 displays the user inputs and messages generated by the cooking computers 16a–c. This type of commercial frying assembly with a cooking computer is disclosed in U.S. Pat. Nos. 4,437,159, 4,672,540, 4,858,119 and 4,663,710, the disclosures of which are herein incorporated by reference.

The preferred embodiment of the present invention uses magnetic switches 32a–d, shown in FIGS. 1, 2 and 3, as sensors to detect when a basket 18 has been placed in a frypot 14. Switches 32a–d are mounted in mounting bars 30a–c which are attached to cabinet 12 along horizontal surface 28. Mounting bars 30a–c have notches 48a–d in which magnetic switches 32a–d are mounted. Switches 32a–d are U-shaped, having slots 46a–d into which shield plates or tabs 34 are placed to close the switches 32a–d. The switches contained in the mounting bars are protected by the mounting bars from damage.

Figure 6:
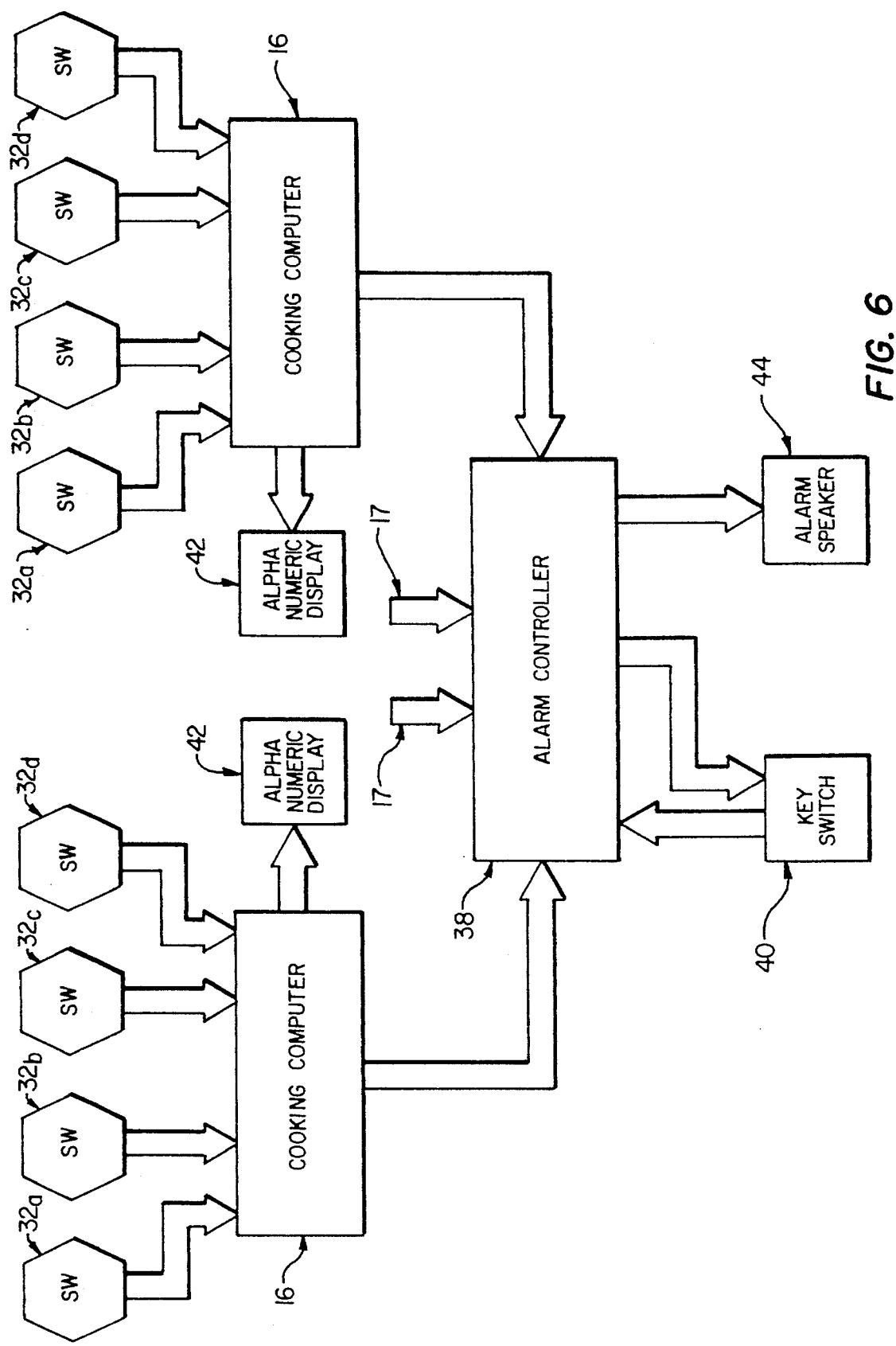
FIG. 6 is a block diagram to show the arrangement of components of the present invention.

Shield plate or tab 34 is attached to each basket 18 by a post 36 such that a shield plate or tab 34 rests in slot 46 of a magnetic switch 32, closing switch 32, when a basket 18 is placed in a frypot 14. As shown in FIGS. 3 and 6, each magnetic switch 32 is electrically connected via wires 70 between a cooking computer 16 and ground. Each cooking computer 16 is electrically connected to alarm controller 38. Alarm controller 38 is then electrically connected to audible alarm 44 and to a key switch 40. Alarm controller 38 is a simple latching circuit. The signal from a computer 16 sets the latch, turning on the alarm by sounding audible alarm 44. The latching circuit is reset with key switch 40 to turn the alarm off.

Each cooking computer 16 monitors switches 32a–d during a cooking cycle. If a basket 18 is removed from a frypot 14, opening switch 32 before the cooking cycle is complete, or if begin cook cycle button 66a–d is pressed before a basket 18 has been placed into the cooking zone of a frypot 14 represented by a particular switch 32, to close the switch, the cooking computer 16 sends a signal to alarm controller 38. The signal activates alarm controller 38, turning on audible alarm 44. Alarm 44 remains on until key switch 40 is turned off, deactivating alarm controller 38. Key switch 40 must be returned to the on position to unlock the cooking computer 16. The key may be under control of management to make sure undercooked food is not served. At the same time the computer sends the signal to alarm controller 38 initiating the audible alarm, the computer 16 activates a visible alarm preferably by activating a decimal point in the alpha-numeric display 42 to indicate which basket was removed early. The computer 16 turns off the decimal point in the alpha-numeric display 42 when the next cooking cycle is initiated.

Figure 4:
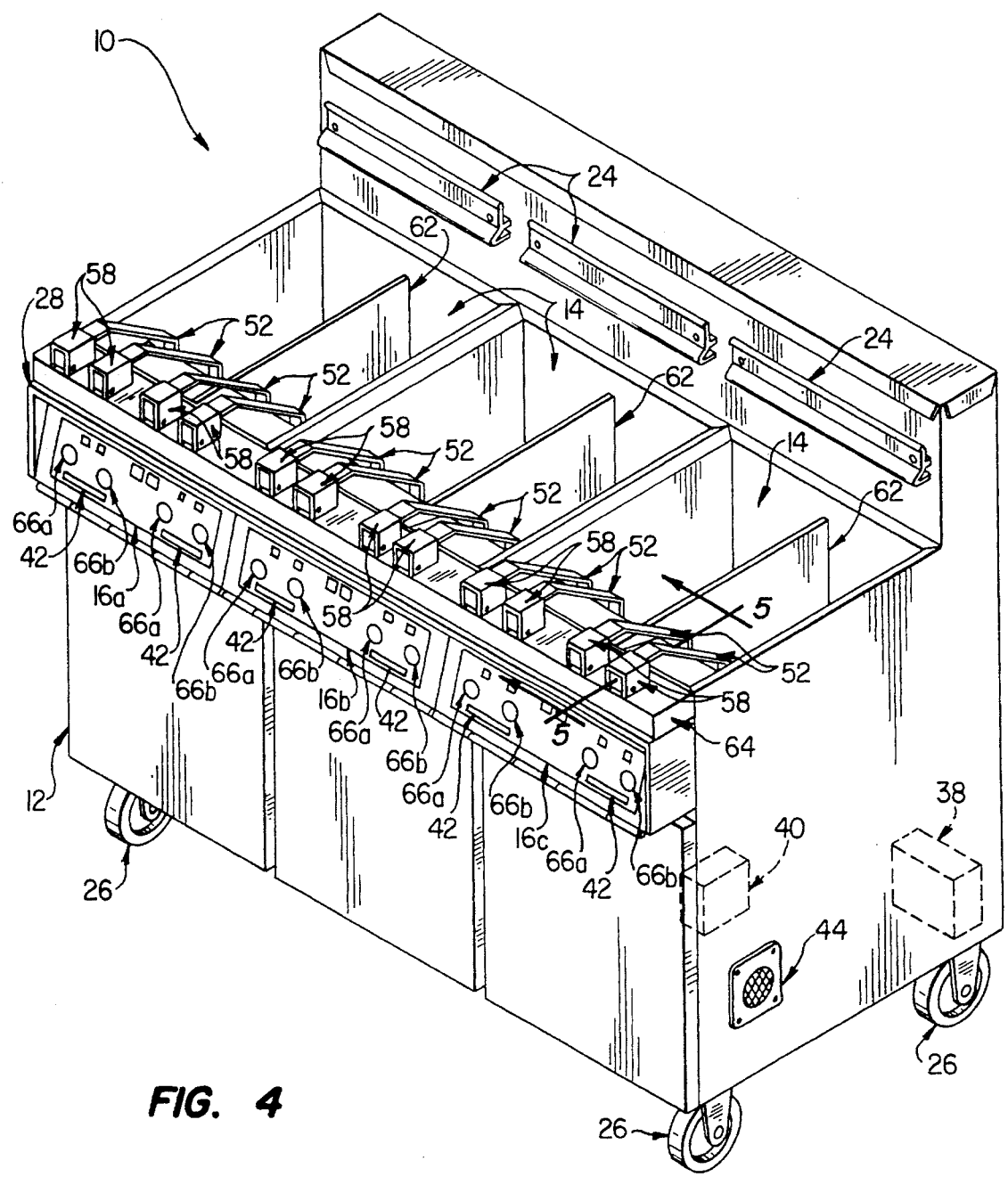
FIG. 4 is a perspective view of a commercial fryer assembly which incorporates a second embodiment of the invention.

Referring now to FIGS. 4 and 5, an alternate embodiment substitutes paddle switches 50 for magnetic switches 32. Paddle switches 50 are mounted to cabinet 12 on mounting plate 64 attached to horizontal surface 28. Paddle switches 50 are covered with protective housing 58 which protects them from damage. A lever arm 52 is attached to housing 58 by hinge 60 and a spring 54 is used to provide an upward force on lever 52, the force being less than the weight of an empty basket 18. Lever 52 contacts each switch 50 via a roller 56. The paddle switches 50 are connected to computer 16 via wires 70 in the same manner as with the magnetic switches.

When a basket 18 is placed in frypot 14 it depresses a lever 52 compressing the spring 54 and closing the paddle switch 50. Removing the basket from the frypot allows the spring 54 to act against lever 52 opening paddle switch 50. A computer 16 monitors each of the switches 50, a closed paddle switch 50 indicating a basket 18 is in a particular cook zone of frypot 14. If computer 16 senses an open switch 50 either during a cooking cycle or at the moment the begin cook button 66 is pressed, a signal is sent to alarm controller 38. Alarm controller 38 then activates alarm speaker 44 until alarm controller 38 is reset by key switch 40. Optical switches connected in a similar manner could also be used as the basket sensors to detect the presence or absence of a basket 18.

FIG. 6 is a schematic block diagram showing the electrical interconnections between the major components which can be used in carrying out the present invention. Sets of switches 32a–d, or alternately the switches 50 in the embodiment of FIG. 5, are connected between the cooking computer and ground and provide an input to cooking computer 16. Cooking computer 16 is electrically connected to and provides relevant outputs to the alpha numeric display 42 and to the alarm controller 38. The alarm controller 38 can receive inputs from one to four cooking computers 16 with unused inputs 17 left floating. The alarm controller 38 is electrically connected to the key switch 40 and the alarm 44.

Figure 7:
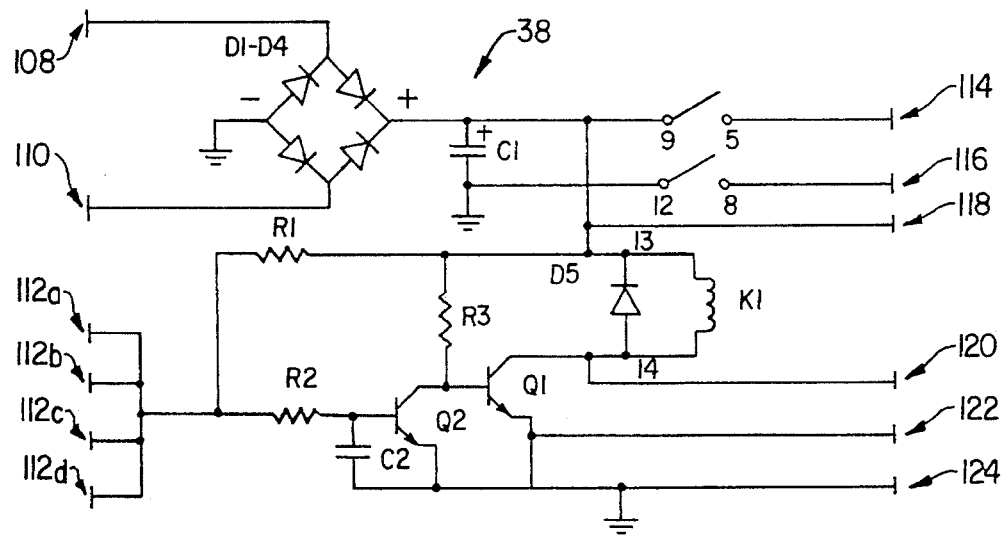
FIG. 7 is a circuit diagram of the alarm controller.

FIG. 7 is an illustration of a circuit diagram embodying a suitable form of alarm controller 38. The circuit shown in FIG. 7 is powered through 12 volt AC hot and return inputs 108 and 110 respectively. Up to four cooking computers each monitoring four switches 32, or 50, can be connected to alarm controller 38 through inputs 112a–d. Output 114 is the output to alarm speaker 44 of FIG. 6. Tabs 116, 118 and 120 are the connections to the key switch 40 of FIG. 6, allowing alarm controller 38 to be deactivated. Connections 122 and 124 are ground connections for alarm controller 38 and alarm speaker 44 of FIG. 6. In FIG. 7, D1–D4 represent a suitable rectifier circuit, R1, R2, and R3 are suitably selected resistances, Q1 and Q2 are transistors, C1 and C2 are capacitors, D5 is a diode, and K1 is a relay. A high voltage condition at any of the inputs 112a–d activates the relay K1 causing the relay to remain active until the key switch 40 is reset which deactivates the relay K1.

Figure 8:
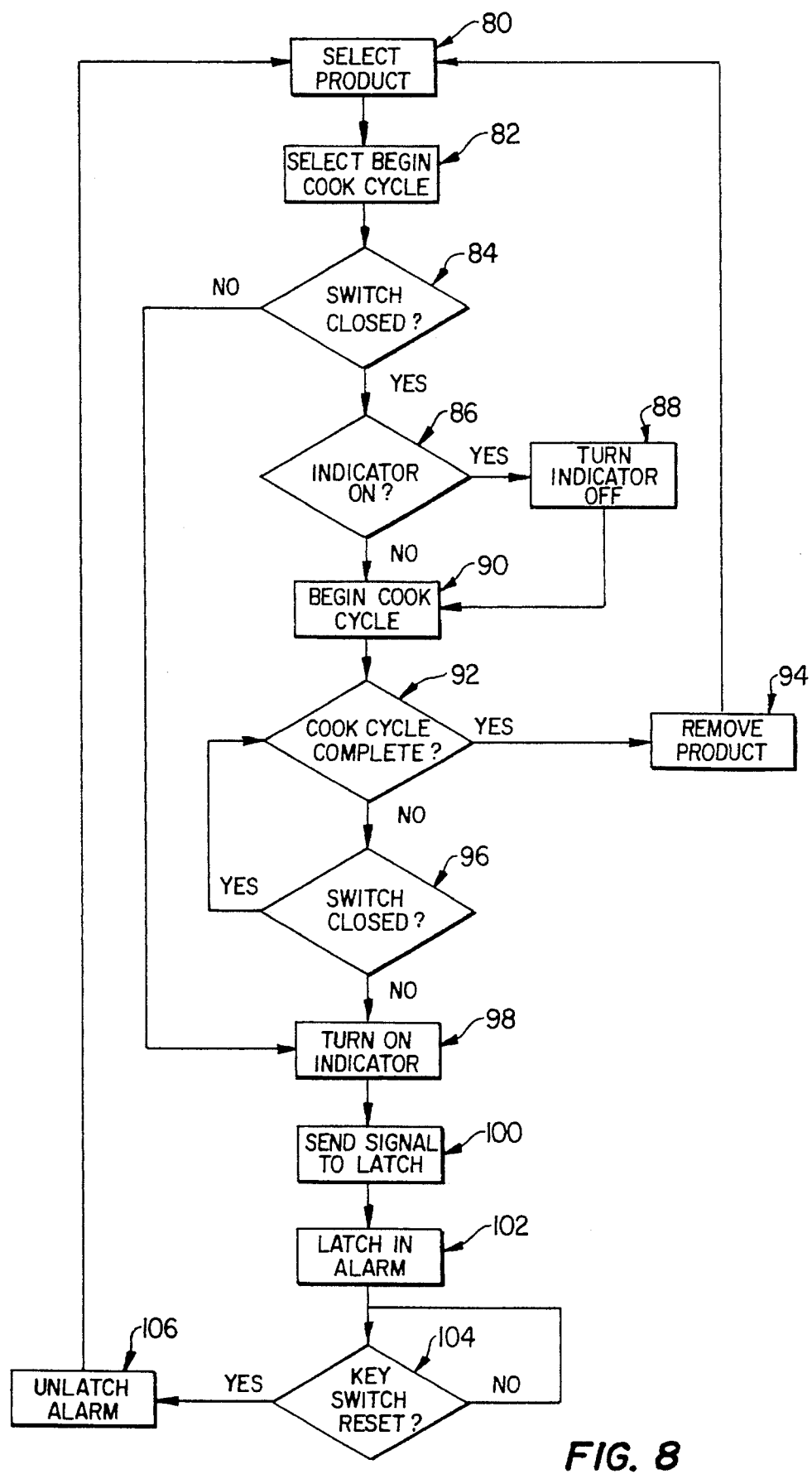
FIG. 8 is a high level flow chart showing the operational flow of the invention.

FIG. 8 is a high level flow chart showing the operational flow of the cooking units containing the invention. It is understood that this process represents any one of the cooking zones represented in FIG. 1. The process begins with the user selecting the product to be cooked as represented by block 80. Once the user has selected the product to be cooked, the user presses the cook button to begin the cooking cycle as shown by block 82. Before the cooking cycle commences the computer checks to make sure that a basket 18 is in the cook zone of the frypot selected by the user as indicated by decision block 84. If there is a basket in the proper zone the process continues to decision block 86; if there is no basket in the zone represented by the cook button pressed, the process initiates the alarm sequence by jumping to block 98. Block 86 represents checking to see if the zone indicator in the alpha numeric display of the cooking computer having the selected cook button has been activated by an earlier alarm sequence. If so, the process represented by block 88, turns the indicator off before continuing the process. After checking the indicator, represented by block 86, the process begins the cook cycle represented by block 90. As far as the present invention is concerned, the cooking cycle involves monitoring the cooking time, represented by decision block 92, and the presence of the basket in the cooking zone, represented by decision block 96. If the cooking cycle is determined to be complete the computer indicates that the basket should be removed, represented by block 94, and then restarts the process by returning to block 80. If the basket is found to have been removed from the zone in use before the cooking time has expired, the alarm sequence is initiated by proceeding to block 98. Block 98 turns on the indicator in the respective alpha numeric display corresponding to the zone from which the basket was removed early. Next, represented by block 100, a signal is sent to the alarm controller latch. The latch is set, as represented by block 102, and the alarm remains on until the key switch is reset as represented by decision block 104. Once the key switch is reset, as represented by block 106, the latch holding the alarm on drops out, and the process returns to block 80 waiting for the user to select a product.

Figure 9:
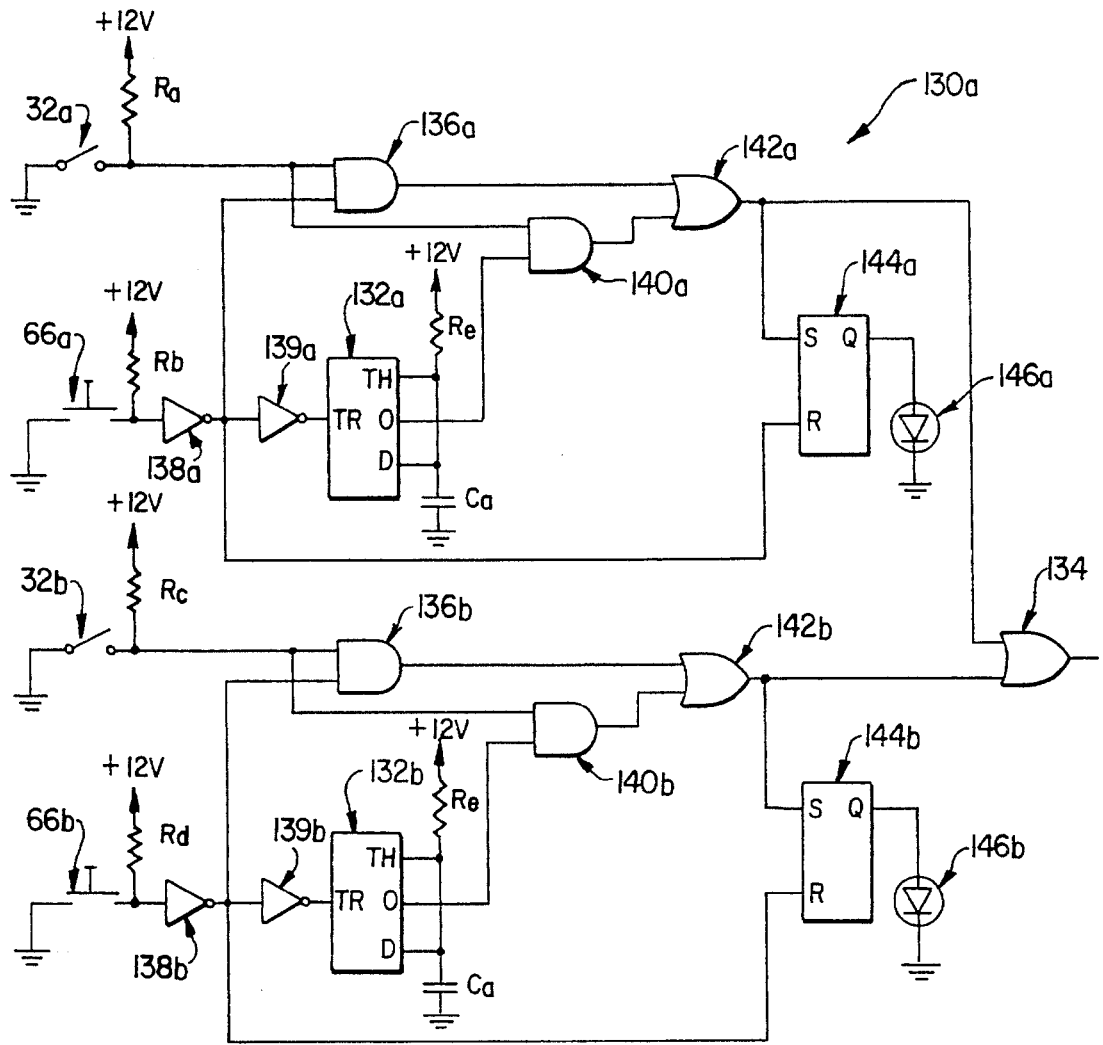
FIG. 9 is a simplified circuit which can be used with the invention.

FIG. 9 is an illustration of a circuit diagram embodying a simple circuit which could be used in the place of the cooking computer 16. The circuit uses simple 555 or the equivalent timers 132a and 132b to measure a cooking time. Basket switches 32a and 32b and begin cook cycle buttons 66a and 66b correspond to the two cook zones in each one half zone of frypot 14 and are pulled high by pull-up resistors Ra–d. The circuits 130a and 130b for each zone are identical and connected through OR gate 134 whose output is 'OR'ed with the identical output from the other half zone of the frypot 14 and then connected to one of the inputs 112 of the controller circuit shown in FIG. 7. Therefore, the following discussion relates to circuits 130a and 130b equally. Begin cook cycle button 66a is connected to AND gate 136a, and to S-R NOR Latch 144a through NOT gate 138a and to timer 132a through NOT gates 138a and 139a. Basket switch 32a is connected to AND gates 136a and 140a. The output of timer 132a provides the second input to AND gate 140a. The output of AND gates 136a and 140a are connected to OR gate 142a with the OR gate 142a output being connected to OR gate 134. The output of S-R NOR latch 144a is connected to LED indicator 146a.

Timer 132a measures the cook time for a cooking zone, which is determined by the values of Re and Ca, and is activated when begin cook button 66a is depressed by the user providing a low signal to timer 132a. Timer 132a outputs a high signal while it is counting the cook time and a low signal while it is inactive. A high output at OR gate 134 which would activate the alarm controller 38 shown in FIG. 7 is triggered in two ways. First, if switch 32a is open when begin cook cycle button 66a is pressed, AND gate 136a responds with a high output driving the outputs of OR gates 142a and 134 high. Second, if the timer is active and outputing a high signal and basket switch 32a is opened, AND gate 140a responds with a high signal driving OR gates 142a and 134 high. Also when either condition for alarm is satisfied and OR gate 142a is driven high, the set input to the S-R NOR latch 144a is driven high driving the latch 144 output high, lighting LED indicator 146a. The latch is reset by a high input from the begin cook cycle button 66a being pressed being applied to the reset input of the latch 144a driving the latch output low.

Suitable components for use in the invention include, magnetic switches 32 of the shield actuation type which can be Aleph model number PS7711. The display 42 is commonly available multiplexed alpha-numeric eight character LED display. The key switch 40 can be a C&K part no. Y210U2C203NQ. All are commonly available through electrical parts suppliers such as W. W. Grainger, Inc., Chicago, Ill. The 555 timer shown in FIG. 9 can be part no. 276-1723 available from the Tandy Corporation, Fort Worth, Tex.

The cooking computer 16 can be anything from a simple solid state or electromechanical clock timer with the ability to monitor the basket sensors 32 and provide an output for the alarm controller 38 such as that shown in FIG. 9, all the way to a general purpose or special purpose computer which functions to control the heating elements and adjust the cooking time based on a plurality of factors as well as performing the alarm functions. The cooking computer should be configured with sufficient ports to receive the inputs from the basket position sensors. A conventional digital computer, such as an IBM PC, can be programmed to be utilized with this invention. The cooking computer actually employed uses an HC11 E1 microprocessor manufactured by Motorola, Inc., Shaumburg, Ill. and a EPROM to store the control program. The EPROM can be a 256K, 250 nanosecond EPROM available from Advanced Micro Devices, Sunnyvale, Calif. The only real changes to a conventional computer are additions in the program of routines to monitor the basket sensors and provide an output to the alarm controller and display. The sensors or switches 32a–d may be connected between previously unused inputs to a computer 16 and ground. The inputs that the switches 32a–d are connected through are pulled high by pull-up resistors so that the switch provides logical inputs to the computer, a high input to the computer when there is not a basket in the frypot and the switch is open, and a low input when a basket is in the frypot and the switch is closed.

The components shown in FIG. 7 are standard, commercially available components. The values or part numbers of the components shown are as follows:

| Reference Numeral: | Description: | Value/Part Number: |
| --- | --- | --- |
| R1, R2 and R3 | resistors | 4.7 kohms |
| C1 | capacitor | .1 microfarads |
| C2 | capacitor | .01 microfarads |
| D1, D2, D3, D4 and D5 | diodes | 1N4003 |
| Q1 and Q2 | transistors | 2N2222 |

It should be understood that various modifications can be made to the embodiments disclosed without departing from the spirit and scope of the present invention. Various engineering changes and choices can also be made without departing substantially from the spirit of the disclosure.

We claim:

1. The combination of a timed frying apparatus, a sensor and an alarm for detecting when a food cycle can be initiated and for signalling when food being cooked in the frying apparatus has been removed for serving before a cook time has elapsed, comprising:

a) a heated frypot
   b) a control system responsive to user input for initiating a cook cycle for a batch of food product to be cooked in the frypot and for terminating said cook cycle by generating a signal indicative of a completed cook time corresponding to a suitable cooking time for said batch of food;
   c) a sensor mounted in association with said frypot and operatively connected to said control system to generate and send a signal to the control system when the batch of food product is placed in the frypot for cooking to indicate that a cook cycle can be initiated and maintained, said signal being interrupted when said batch of food is removed from the frypot for serving; and
   d) an alarm responsively connected to said control system to produce a warning alarm to the user if said batch of food product is removed from said fryer before the cook cycle is completed.

2. The combination of claim 1 wherein the control system operates the alarm if the signal from the sensor to indicate that a cook cycle can be initiated and maintained is received by the control system after a cook cycle has been initiated.

3. The combination of claim 1 wherein the frypot has at least two of said sensors spaced apart in such a manner as to be responsive to physically separated batches of food product which can be placed in said frypot for cooking and said control system has at least two separate cook cycles for cooking zones where physically separated batches of food corresponding to said at least two sensors may be placed for cooking, each of the at least two sensors being operatively connected to one of the at least two separate cook cycles whereby the alarm will be energized if a physically separated batch of food product is removed from the frypot before its cook cycle is completed.

4. The combination of claim 3 wherein the control system has a display panel to identify each of the physically separated batches of food product and indicate which of the separated batches of food product have been removed before its cook cycle has been terminated.

5. The combination of claim 4 wherein said physically separated batches of food are contained in baskets and said at least two sensors comprise switches connected to the control system, each of said switches being operated by some portion of a basket when a basket is placed in the frypot for cooking.

6. The combination of claim 5 wherein said switches are magnetically operated switches mounted externally of the frypot and operated by a tab attached to said some portion of a basket.

7. The combination of claim 5 wherein said switches comprise at least two paddle switches each of which operate by contact with some portion of a basket when a basket is placed into or removed from said frypot.

8. The combination of claim 2 wherein the control system comprises a programmable digital computer for separately controlling a plurality of cook cycles corresponding to a plurality of physically separated batches of food product to be cooked in said frypot and said sensor comprises a plurality of sensors connected to the control system in such a manner that each is operatively associated with one of the plurality of cook cycles and spaced apart in association with said frypot to signal the control system to energize the alarm if one of the physically separated batches of food product is removed early before its cook cycle is completed.

9. The combination of claim 8 wherein said plurality of sensors comprise switches located at spaced apart slots in a mounting bar positioned on a horizontal surface adjacent to said frypot, said frypot being equipped with one or more baskets having a tab adapted to operate said switches which is received in one of said slots when a basket is placed into said frypot for cooking.

10. The combination of claim 8 wherein said plurality of sensors comprise switches spaced apart in a housing positioned on a surface adjacent to said frypot, each of said switches being operated by an arm extending into said frypot which is responsive to the presence or absence of a basket in said frypot.

11. An early product removal warning system for detecting the early removal of a food in a basket from a frypot holding a cooking medium, comprising:

a) a computer, programmable to receive and monitor a cooking time;

b) a sensor, coupled to the computer, wherein the sensor provides an input to the computer indicating whether the basket is in the frypot; and c) an alarm, coupled to the computer, wherein the computer activates the alarm when the sensor indicates that the basket has been removed from the frypot before the cooking time has elapsed.

12. The system of claim 11 wherein the sensor is a switch.

13. The system of claim 12 wherein the switch comprises a magnetic interrupter switch comprising two contacts and a shield plate, the contacts being mounted on the frypot and the shield plate being attached to the basket.

14. The system of claim 12 wherein the switch comprises a paddle switch connected to the frypot such that the basket depresses the paddle switch when the basket is placed in the frypot.

15. The system of claim 11, the computer further comprising a visual display wherein the computer is responsive to removal of the basket before the cooking time has elapsed to generate a signal to activate the visual display.

16. The system of claim 11 further comprising a key switch to deactivate the alarm once it has been activated.

17. An early product removal warning system, comprising:

a) a frypot for cooking a food in a cooking medium;

b) at least one removable basket to hold the food in the frypot;

c) a computer, to receive and monitor a cooking time;

d) a switch, coupled to the computer, wherein the switch is closed when the removable basket is in the frypot; and e) an alarm, coupled to the computer, wherein the computer activates the alarm when the switch is opened by removing the basket from the frypot before the cooking time has expired.

18. The system of claim 17 wherein the switch is a magnetic interrupter switch comprising two contacts and a shield plate, the contacts being mounted on the frypot and the shield plate being attached to the basket.

19. The system of claim 17 wherein the switch is a paddle switch connected to the frypot such that the basket depresses the paddle switch when the basket is placed in the frypot.

20. The system of claim 17, the computer further comprising a visual display wherein the computer is responsive to removal of the basket before the cooking time has elapsed to generate a signal to activate the visual display.

21. The system of claim 17 further comprising a key switch to deactivate the alarm once it has been activated.

22. The method of indicating early product removal of a food product from a frypot containing a heated cooking medium comprising:

a) placing at least one basket holding a food item into a frypot;

b) sensing the presence or absence of at least one basket in the frypot;

c) initiating a timed cook cycle representative of a proper cooking time for said at least one basket;

d) determining that said at least one basket is present in the frypot during the timed cook cycle; and e) activating an alarm in response to removal of the at least one basket from the frypot before the proper cooking time has elapsed.

23. The method of claim 22 further including the steps of providing a display and activating the display to show when said at least one basket has been removed form the frypot before the proper cooking time has elapsed.

24. The method of claim 22 further including the step of activating the alarm if the absence of said at least one basket in the frypot is sensed at the time the cook cycle is initiated.

25. The method of claim 24 further including the steps of providing a display and activating the display to show when said at least one basket has been removed from the frypot before the proper cooking time has elapsed.

* * * * *